United States Patent [19]

Hamielec et al.

[11] 4,414,370

[45] Nov. 8, 1983

[54] PROCESS FOR CONTINUOUS BULK COPOLYMERIZATION OF VINYL MONOMERS

[75] Inventors: Archie E. Hamielec, Burlington, Canada; Grant P. Lawless; Harold H. Schultz, both of Racine County, Wis.

[73] Assignee: S. C. Johnson & Son, Inc., Racine, Wis.

[21] Appl. No.: 337,343

[22] Filed: Jan. 6, 1982

Related U.S. Application Data

[63] Continuation of Ser. No. 223,597, Jan. 9, 1981, abandoned.

[51] Int. Cl.$^3$ .......................... C08F 2/02; C08F 212/08
[52] U.S. Cl. ........................................ 526/88; 526/209; 526/317
[58] Field of Search ................. 526/88, 209, 317, 346

[56] References Cited

U.S. PATENT DOCUMENTS

| | | | |
|---|---|---|---|
| 2,496,653 | 2/1950 | Allen et al. | 260/93.5 |
| 2,556,488 | 6/1951 | Wakeford et al. | 260/29.8 |
| 3,053,033 | 5/1962 | Schweitzer et al. | 526/317 |
| 3,080,348 | 3/1963 | Lang et al. | 260/86.7 |
| 3,308,078 | 3/1967 | Rogers et al. | 260/27 |
| 3,673,168 | 6/1972 | Burke et al. | 526/209 |
| 3,711,436 | 1/1973 | Oliver | 260/28.5 R |
| 3,753,958 | 8/1973 | Wingler et al. | 260/78.5 R |
| 3,859,268 | 1/1975 | Novack et al. | 260/88.2 |
| 3,879,357 | 4/1975 | Wingler et al. | 260/80.72 |
| 3,968,059 | 7/1976 | Shimada et al. | 526/68 |
| 3,979,352 | 9/1976 | Brady et al. | 260/33.4 R |
| 4,013,607 | 3/1977 | Dwyer et al. | 260/29.6 H |
| 4,022,730 | 5/1977 | Lewis et al. | 260/28.5 R |
| 4,023,977 | 4/1977 | Mercurio et al. | 106/178 |
| 4,075,242 | 2/1978 | Rhum et al. | 560/190 |
| 4,117,235 | 9/1978 | Taylor | 526/205 |
| 4,137,389 | 1/1979 | Wingler | 526/190 |
| 4,195,169 | 3/1980 | Priddy | 526/317 |
| 4,237,257 | 12/1981 | Moriya et al. | 526/230.5 |
| 4,245,074 | 1/1981 | Buter | 526/214 |

FOREIGN PATENT DOCUMENTS

| | | | |
|---|---|---|---|
| 859517 | 1/1961 | United Kingdom | 526/346 |
| 1107249 | 3/1968 | United Kingdom | |

OTHER PUBLICATIONS

Aiche Symposium Series, vol. 72, pp. 112–127, (1976).
Bengouh and Park, European Polymer Journal, vol. 14, pp. 889–894, (1978).

*Primary Examiner*—Edward J. Smith

[57] ABSTRACT

A process to bulk polymerize vinylic monomers to prepare low molecular weight polymers employing thermal initiation at reaction temperatures from 235° C. to 310° C. and residence times of at least 2 minutes in a continuous stirred reactor zone containing the molten resin mix.

9 Claims, 1 Drawing Figure

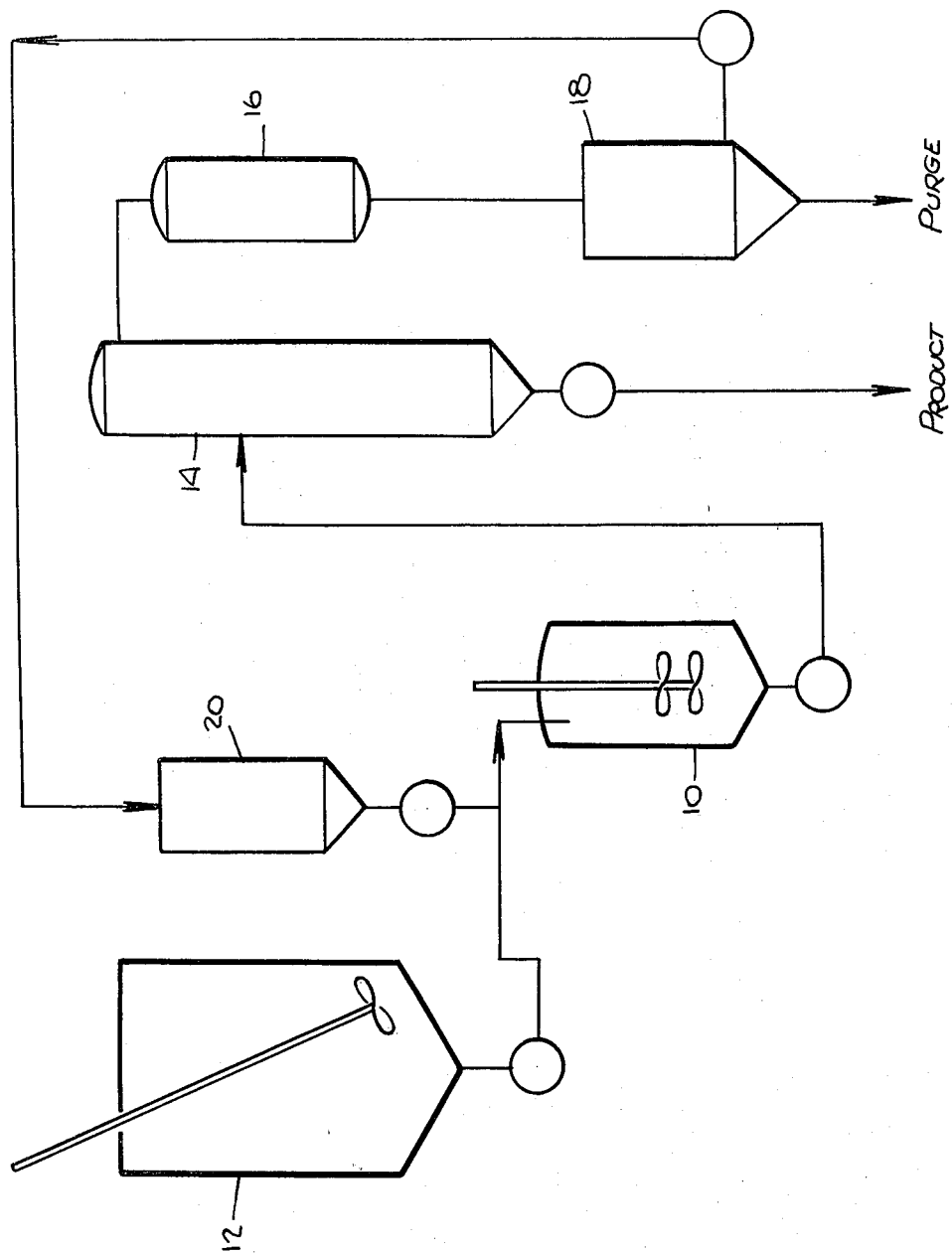

PROCESS FOR CONTINUOUS BULK COPOLYMERIZATION OF VINYL MONOMERS

This is a continuation, of application Ser. No. 223,597, filed Jan. 9, 1981, now abandoned.

This invention relates to a process for bulk copolymerizing vinyl monomers by thermal initiation. In particular, it relates to a method for forming low molecular weight polymers of relatively uniform molecular weight by continuous bulk copolymerization.

Styrene and acrylic acid copolymers, conveniently identified as (S/AA), of low molecular weight have found wide acceptance in industry. Such copolymers, sometimes denominated "solution polymers," have been employed in inks, floor polishes, paper coatings, paints and adhesives. Typical solution polymers have a number average molecular weight ($M_n$) from about 2000 to 5000 and a weight average molecular weight ($M_w$) from about 7000 to 10,000. Heretofore, low molecular weight solution-type polymers have been produced employing mass polymerization techniques. Typically, by such techniques, vinylic monomers were polymerized in the presence of a solvent and at low temperatures of about 120° C. Often the reaction was expedited with the assistance of catalytic initiators and chain transfer agents, to help control the molecular weight of the product copolymers. Examples of such polymerization techniques are disclosed in U.S. Pat. Nos. 2,556,488, 3,673,168, 3,753,958, 3,879,357 and 3,968,059.

With the cost of petroleum feedstock rising explosively in recent years, the price of vinyl monomers has risen dramatically. Accordingly, there exists a need to reduce the time and expense in preparing low molecular weight vinyl copolymers by simplifying process techniques. The solvents normally employed in solution polymerization are expensive. Solvent recovery equipment must be utilized for economic operation and safety problems have arisen with the use of volatile organic solvents. Similar problems exist when employing chemical initiators or catalysts and/or chain transfer agents in the process. Since solution polymerization is typically carried out in large batches, if the process malfunctions, then an unacceptably large amount of product must be wasted.

Previously, styrene monomer has been homopolymerized to form high molecular weight polymers from 20,000 to 100,000 ($M_w$) in a continuous mass polymerization process without solvents, catalytic initiators and molecular weight regulators, as disclosed in U.S. Pat. Nos. 2,496,653 and 3,859,268. It has been generally recognized that at temperatures above about 200° C., thermally initiated styrene polymerization produces products having undesired dimers, trimers and oligomers of wide ranging molecular weight and having a high dispersion index (weight average molecular weight—$M_w$/number average molecular weight —$M_n$). It has long been desired to produce solution polymers useful in providing an alkali cut on the order of 25 to 35% solids for use in various finishes, polishes and the like or for ink resins. Heretofore, solution polymers at high solids content were unduly viscous and difficult to handle and process. This was due, in part, to their high dispersion index.

In general, for commercial use in solution polymer applications a product should exhibit a relatively uniform molecular weight, having a dispersion index of less than about 2. Thermally initiated styrene homopolymerization at elevated temperatures has not provided acceptable dispersion indices. In the article by Husain and Hamielec, AICHE Symposium Series, Vol. 72, pp. 112-127 (1976), during bulk thermal polymerization of styrene in a tubular reactor, a "run-away" reaction at 297° C. provided a polystyrene with a polydispersibility of 3.68. In Bengouh and Park, *European Polymer Journal*, Vol. 14, pp. 889-894 (1978), at reactor temperatures of 230° C. to 250° C., polydispersity was from 3 to 3.8 after thermal initiated polymerization of styrene monomer.

It has been disclosed in U.S. Pat. No. 4,117,235 that batches of an acrylic monomer can be thermally polymerized in sealed glass tubes at temperatures from 230°-280° C. to provide an acrylate polymer with a number average molecular weight of less than about 5000, in the presence or absence of a chain transfer agent or solvent. However, this process is not conducted on a continuous basis. For practical applications, a continuous process is required. Homopolymerization is exemplified. Neither the dispersion index of the resulting material nor its dimer, trimer or oligomer content, was provided.

Accordingly, the art has long sought a continuous bulk polymerization process capable of selectively producing low molecular weight vinylic copolymers having a low dispersion index, employing thermal initiation, without the need of a solvent, catalyst or weight retarding agent. As employed herein, the term "vinylic polymer" refers to the addition polymer formed by polymerizing vinylic monomers. Typical vinylic monomers include such diverse monomers as α-methyl styrene vinyl toluene, styrene, acrylic or methacrylic acids, acrylic or methacrylic esters and the like. Further, contemporary industry standards require that such a process have sufficient flexibility to selectively increase or decrease the molecular weight of the desired product in accordance with market requirements.

These and other objects are attained in a bulk polymerization process for preparing low molecular weight vinylic polymers having a dispersion index less than about 2 and a number average molecular weight from about 1000 to 6000 comprising the steps of continuously:

(a) charging a mixture of vinylic monomers into a continuous stirred reactor zone containing a molten resin mixture comprising unreacted vinylic monomers and said vinylic polymers;

(b) maintaining the molten resin mixture at a reaction temperature from about 235° C. to 310° C.; and (c) maintaining a flow rate through said reaction zone sufficient (1) to provide a residence time of said charged vinylic monomer mixture in said reaction zone of at least about 2 minutes to provide a reaction product containing a vinylic polymer product; and (2) to maintain a predetermined level of reaction mixture in said reaction zone; wherein said mixture of vinylic monomers comprises at least one monoalkenyl aromatic monomer and at least one acrylic monomer.

In general, a mixture of two or more vinyl type monomers, preferably including styrene and an acrylic monomer, are charged continuously into a reactor zone containing molten resin having the same ratio of vinyl monomers as the monomer mixture. The molten resin is maintained at a preset temperature to provide a polymer of the desired molecular weight. Reaction product is pumped out of the reaction zone at the same weight rate as the monomers are charged to provide a fixed level of resin in the system.

To reduce the unreacted monomer content of the polymer product, the molten resin may be subjected to separation means to remove or reduce the content of unreacted monomer and any volatile by-products. Such unreacted monomer may be recovered and reused in the system.

While applicable to such monoalkenyl aromatic monomers as alpha-methyl styrene, vinyl toluene, para-methylstyrene and tertiary butyl styrene, enhanced results are obtained when the aromatic monomer contains styrene or a mixture of α-methyl styrene and styrene in a weight ratio of from about 2:1:1:2.

A second component of the polymer produced by the present process is an acrylic monomer. The term "acrylic monomer," as employed herein, includes acrylic acid alone or mixtures of acrylic acid and an ester or other derivative of acrylic acid or methacrylic acid. Typical examples of such acrylic acid or methacrylic acid, ester or derivative include: methacrylate esters, as methyl methacrylate, hydroxy ethyl methacrylate and dimethylaminoethylmethacrylate; methacrylic derivatives, such as methacrylic acid and salts thereof and methacrylonitrile; acrylate esters, such as methyl acrylate and ethyl acrylate; and acrylic acid derivatives, as acrylonitrile.

Other suitable nonacrylic ethylenic monomers can be added to the monomer charge, including vinyl esters, such as vinyl acetate and maleic acid. The proportions of such monomers can be varied. In certain instances it may be possible to substitute such monomers for the acrylic monomer.

Preferred monomer charges include: the comonomers, styrene and acrylic acid and the termonomers, α-methyl styrene/styrene and acrylic acid. Such charges provide, respectively, a preferred copolymer (S/AA) and a preferred terpolymer (AMS/S/AA) having a low dispersion index, having low residual monomer content and exhibiting a number average molecular weight adapted to be controlled to a narrow predetermined range by presetting the reaction temperature and residence time in accordance with the invention.

The preferred monomer charge employs from about 60–80% by weight monoalkenyl aromatic monomer and 40–20% by weight of acrylic monomer, such as acrylic acid. Most preferably the monoalkenyl aromatic monomer is styrene or a mixture of styrene and α-methyl styrene in a weight ratio from 2:1 to 1:2. It is particularly preferred to employ 3 parts by weight to 2 parts by weight of styrene solids per part of acrylic acid.

In order to obtain a polymer of the invention with the desired molecular weight and dispersion index to provide a high quality solution-type polymer, the reaction temperature is maintained from about 235° C. to about 310° C.

The minimum reaction temperature at steady state will vary, depending on the particular monomers charged to the reactor. Generally, it was found that at temperatures below about 175° C., the material formed was too viscous to process efficiently.

At reaction temperatures below about 235° C. the number average molecular weight may exceed the desired maximum of about 6000. Further, the uniformity of the reaction product deteriorates unacceptably. In particular, the dispersion index, an important measure of uniformity, shows that the spectrum of copolymer produced is broadened considerably, when the reaction temperature is maintained below about 235° C.

Enhanced results are obtained and accordingly it is preferred to employ reaction temperatures from about 245° C. to 275° C. Within the preferred temperature range it is possible to achieve the most desirable balance of copolymer properties, such as molecular weight, dispersion index, purity, and ability to form a high solids content, alkali-soluble resin cut.

At temperatures above about 310° C., the temperature can have adverse effects on the product. In addition, at higher reaction temperatures the polymer products tend to be discolored and exhibit undesired yellowing possibly by formation of undesired by-products, including oxidation products. Further, at such elevated temperatures, the resulting polymer products may be subjected to depolymerization, reversible reactions and other side reactions which yield dimers, trimers and other undesired low molecular weight oligomers. Such by-products contaminate resin cuts of product polymer and contribute to their high optical density. This, in turn, indicates that off-color finishes can be expected employing such resin cuts.

In general, the reaction time or residence time in the reaction zone is controlled by the rate of flow of constituents through the reaction system. The residence time is inversely proportional to flow rate. It has been found that at a given temperature, the molecular weight of the polymer product decreases as the residence time increases.

In accordance with these factors it is therefore preferred to utilize reaction residence times of at least about 2 minutes to provide satisfactory reaction completion. While the residence time in the reaction zone may be as long as 1½ hours, normally discoloring reactions and other side reactions will dictate that shorter residence times be employed. For most cases a residence time of from about 5 to 45 minutes, and, preferably, from 10 to 20 minutes is satisfactory. In general, even longer residence times increase the yield of product, but the rate of increase of product is generally very slow after about 20 to 30 minutes of reaction.

The flow rate of reactants for the preferred styrene/acrylic acid monomer mix is between about 0.1 to 1.5 pound per minute per gallon of reactor capacity. The flow rate selected for a particular monomer system will depend upon the reaction temperature, constituents, desired molecular weight, desired dispersion index and the particular system employed.

For best results, to produce a given resin of a desired $M_n$ and $M_w$ with low residual monomer, the reaction temperature and residence times are mutually manipulated in accordance with the principles provided herein.

The reaction pressure in an enclosed system is a function of residual vapor pressure of unreacted monomer and other volatiles present either in the feed, such as water, or in the reaction mix (produced in side reactions). Although at steady state the process is carried out under a positive pressure, the reaction pressure has no significant effect on the yield and the upper limit is a function of equipment capability, while the lower limit is a function of feed rate and monomer composition. At higher temperatures, the higher gas pressures which result may require special equipment and procedures for safe handling.

In a preferred embodiment of the invention a solvent, capable of forming a reaction product with the copolymer, is incorporated in the mixture of vinylic monomers. The solvents act to reduce the viscosity of the product. The solvent also acts to lower the viscosity of an alkali cut of the copolymer at high solids contents from about 25 to 35% non-volatiles. It has been found that a portion of the solvent is strongly associated (by reaction or binding) with the copolymer, while the remaining portion is loosely associated with the copolymer.

For best results from about 1 to 20% by weight of vinylic monomers of the solvent, is employed. While greater or lesser amounts can sometimes be employed, there is an insufficient reduction in viscosity, when less than about 1% of solvent is employed. When amounts greater than about 20% by weight of solvent are utilized, then the process tends to become solvent dependent as a typical solution polymerization process. For best results from about 1 to 10% by weight of solvent is preferably employed.

The solvents employed include polyalkoxy monoalkanols. Such polyethers are well known to the art. Typical examples include the family of solvents derived from 2-ethoxyethanol, known to the art as Cellosolve. Illustrative solvents are butyl Cellosolve and Cellosolve acetate. A particularly preferred solvent is diethylene glycol monoethyl ether, known industrially as Carbitol. Other useful solvents include ethylene glycol monomethyl ether and diethylene glycol monomethyl ether.

When other solvents, such as methyl isobutyl ketone (MIBK), are employed the desired results have not been achieved. MIBK does not become associated with the copolymer. When ethylene, propylene or diethylene glycol are employed as the solvent or part of the solvent, the molecular weight distribution will be widened or gelation can occur depending on the level of the dihydric alcohol and the degree of cross-linking which occurs.

It has been found that the addition of solvent reduces the acid number of the polymer product. More importantly, it also permits formulation of an alkali soluble resin cut having a solids content from about 25 to 35% nonvolatiles at acceptable viscosity.

A preferred embodiment of the process of the present invention is illustrated in the accompanying drawing, which is a flow sheet showing the polymerization process.

The process of the present invention involves the use of a variable fillage type stirred reactor for the polymerization of vinylic monomers to copolymers having a narrow-molecular weight distribution by the proper balancing of the conditions of polymerization and flow rates. The reaction zone as represented by reactor 10 can comprise a continuous stirred tank reactor of any type adapted for variable fillage operation of from as low as 10% to 100% of the usable volume thereof for the production of vinylic polymers. This continuous stirred tank reactor may be either horizontal or vertical and should have provision for close control of the temperature therein by any desired means, including control by cooling jacket, internal cooling coils or by withdrawal of vaporized monomer followed by condensation thereof and return of the condensed monomer to the reaction zone. It will be apparent to those skilled in the art that this reaction zone can, if desired, be constituted by a plurality of continuous stirred tank reactors operated in series. Likewise, it will be apparent that such reaction zone can comprise more than one continuous stirred tank reactor operated in parallel if it is desired to employ several relatively small reactors to supply the capacity of the final reaction zone rather than a single large reactor for that purpose.

A preferred form of continuous stirred reactor which has been found quite suitable for carrying out the process is that general type illustrated in the accompanying drawing wherein a tank reactor is provided with cooling coils sufficient to remove any heat of polymerization not taken up by raising the temperature of the continuously charged monomer composition so as to maintain a preselected desired temperature for polymerization therein. Preferably also such continuously stirred tank reactor will be provided with at least one and usually more vaned agitators driven by an external power source such as a motor. At least one such agitator is positioned to provide agitation of liquid contained in the reactor while operating at minimum fillage, i.e., as low as 10% of the volume thereof. Such a continuous stirred tank reactor can, if desired, be provided with additional features for improved efficiency of operation and safety, such as an additional series of internal cooling coils adapted to effectively prevent any "run-away" polymerization if the normal holding period has to be extended for some reason and an outer jacket for additional cooling or heating of the contents of the reactor.

In operation of the present continuous bulk, polymerization process, flexibility and range of choice can be realized in polymer types produced, as well as the production rate thereof, by proper choice of polymerization reaction conditions. The drawing illustrates the operation of the reaction zone of the present process and the manner in which such operation is incorporated into an overall polymer production line. In operation a monomer composition comprising polyalkenyl aromatic and acrylate monomers as described above, is charged to reactor 10 and the temperature of the monomer feed is raised to from about 235° C. to 310° C. to produce thermal polymerization. Reactor 10 is charged from stirred seed tank 12 which contains the reaction charge of monomers. Pressure in reactor 10 can vary from 40 to 400 psia or even higher. It is preferred to operate reactor 10 at from about 50 to about 300 psia, and most preferably from about 150 to about 200 psia.

After the initial fillage of reactor 10 to the desired preselected level and polymerizing the charged monomer to approximately the desired solids content, then the volume of monomer composition charged thereto is adjusted to a value to maintain such preselected level of liquid in reactor 10. Thereafter, the liquid mixture of polymer and monomer is withdrawn from reactor 10, to maintain the preselected level of such liquid mixture in the reaction zone. Polymerization conditions are continuously maintained in reactor 10 to produce a polymer of selected molecular weight and selected degree of conversion or weight percent solids of polymer in such liquid mixture. The reaction zone can be operated so as to produce a liquid mixture with a polymer concentration or percent solids from as low as 30 percent to as high as 95 percent by weight and such polymer can possess a number average molecular weight ranging from 1000 to 6000. The level of fillage of reactor 10 can vary from as low as 10 percent to as high as 100 percent, usable volume, and may be controlled by any desired means, for example, a level controller and associated valve or pump in the transfer line from reactor 10.

Any desired means of controlling the temperature within reactor 10 may be employed. It is preferred that the temperature be controlled by circulation of a cooling fluid, such as oil, through internal cooling coils in those reactors so equipped such as reactors of the type illustrated. The entry of relatively cool monomer composition serves to remove the greater proportion of the heat of polymerization released and the internal cooling coils serve to remove the remainder so as to control the temperature of the liquid mixture therein to a preselected value and thus produce a polymer of the desired degree of conversion and average molecular weight.

As the polymer concentration increases, the possibility of damage from "run-away" reactions, is substantially reduced. In general it is preferred to produce in the reaction zone a solids content of from 80 to 95 percent by weight of a polymer of relatively average molecular weight of from about 1000 to 6000 and of relatively narrow molecular weight distribution. The residence time in the reaction zone can vary from about 5 to 45 minutes.

In the drawing there is illustrated a zone of devolatilization. In one embodiment devolatizer 14 is a stirred tank adapted to receive unreacted monomers and polymer product at atmospheric conditions. The process of the present invention can be operated by the use of a single or multiple zones of devolatilization, as desired. In the process outlined the vaporized monomers as well as any low oligomers thereof, are removed from the devolatilization zone, liquefied in a condenser 16 and passed to a receiver 18. From the receiver a stream of the condensed monomers and oligomers can be recycled to recycle tank 20 and then to reactor 10 as shown. If desired, the oligomers can be vaporized in the devolatilization zone and separated from the vaporized monomers prior to their condensation. Such oligomers can be separately recycled to a reaction zone or purged from the process. In general, the equipment for the present process is known to the art and has been described for use in other bulk polymerization procedures in U.S. Pat. No. 3,968,059 and U.S. Pat. No. 3,859,268.

The resin product pumped from the devolatizer 14 can be solidified by appropriate means or cut into an appropriate solvent system. The resin product may be solidified by employing a conventional flaker. The product flakes can be packaged in accordance with known techniques. For example, the flakes may be conducted to a flake bin by suction and then transported to a bagger.

The following examples are set forth to illustrate more clearly the principles and practice of this invention to one skilled in the art. As such, they are not intended to limit the invention but are illustrative of certain preferred embodiments. In these Examples molecular weight of polymer product was determined in accordance with conventional gel permeation chromatography.

Example I

A vertical stirred tank reactor of 1 gallon capacity adapted for cooling by oil was filled to 50% of its volume from a feed tank containing a mixture of 23 parts alpha-methylstyrene, 45 parts styrene and 32 parts acrylic acid and brought to a polymerization temperature of 272° C. Polymerization was begun with stirring and continued until the solids content of the liquid reaction mix reached about 90% solids. Thereafter, a feed rate of 0.80 pounds per minute of the aforesaid monomer mixture per gallon of reactor was maintained and a residence time of 5 minutes was attained in the first reactor. The temperature of the polymerizing liquid in the first reactor was maintained at 272° C. by circulating oil through the reactor jacket. A continuous withdrawal of polymer and monomer was established to maintain the initial level in the reactor.

A stirred devolatizer tank was filled with the effluent from the reactor to 10-20% of its volume. The temperature in the devolatized tank was maintained at 272° C. Vaporized monomers and oligomers were condensed and monomer mix was recycled to a recycle feed for delivery to the tank reactor.

A terpolymer product was recovered from the tank having a number average molecular weight of 2640, a weight average molecular weight of 4500, a dispersion index of 1.70 and an acid number of 190. The terpolymer product was processed into flakes.

The flakes were processed into a 20% nonvolatiles, resin cut according to conventional procedures. The optical density of the resin cut was 0.1 at 400 nanometers (nm).

Example II

In order to demonstrate the effect of reaction temperature on the molecular weight, dispersion index and optical density of a 20% product resin cut, test runs were conducted in accordance with the procedure set forth in Example I. For each run, the monomer charge, reaction temperature, T, (in °C.), feed rate (lbs/min), residence time (R/T) (in minutes), number average molecular weight Mn of product, weight average molecular weight Mw of product, dispersion index Mw/Mn of product, and optical density, O.D., (log Io/I) of product were measured. The results are set forth in Table 1.

TABLE 1

| Monomers parts/parts | Feed Rate lbs/min | Residence time minutes | Temp. °C. | Mn | Mw | Mw/Mn | O.D. (400 nm) |
|---|---|---|---|---|---|---|---|
| 68S*/32AA** | 0.4 | 10 | 309 | 1300 | 1770 | 1.36 | 2+ |
| 37AMS/31S/32AA | 0.2 | 20 | 300 | 1110 | 1540 | 1.39 | 2 |
| 68S/32AA | 0.4 | 10 | 297 | 1630 | 2400 | 1.97 | 0.95 |
| 72S/28AA | — | 10 | 289 | 1800 | 2900 | 1.61 | 0.42 |
| 68S/32AA | 0.4 | 10 | 287 | 2070 | 3600 | 1.74 | 0.41 |
| 68S/32AA + 10% DEGMEE° | 0.26 | 15 | 278 | 2000 | 3140 | 1.57 | 0.18 |
| 68S/32AA | 0.4 | 10 | 276 | 2680 | 5300 | 1.98 | 0.19 |
| 68S/32AA | 0.4 | 10 | 271 | 2830 | 5500 | 1.94 | 0.16 |
| 68S/321AA | 0.4 | 10 | 267 | 3130 | 5200 | 1.66 | 0.11 |
| 68S/32AA | 0.4 | 10 | 263 | 3430 | 6500 | 1.90 | 0.18 |
| 72S/28AA | 0.26 | 10 | 260 | 3580 | 7100 | 1.98 | 0.07 |
| 39AMS***/33S/28AA | 0.80 | 5 | 254 | 3570 | 6200 | 1.74 | 0.11 |
| 24AMS/48S/28AA + 10% DEGMEE | 0.80 | 5 | 249 | 4660 | 8600 | 1.85 | 0.08 |
| 37AMS/31S/32AA | 0.26 | 15 | 246 | 2920 | 4900 | 1.68 | 0.04 |

TABLE 1-continued

| Monomers parts/parts | Feed Rate lbs/min | Residence time minutes | Temp. °C. | Mn | Mw | Mw/Mn | O.D. (400 nm) |
|---|---|---|---|---|---|---|---|
| 39AMS/33S/28AA | 0.80 | 5 | 238 | 5560 | 10,600 | 1.91 | 0.06 |
| 68S/32AA | 0.4 | 10 | 223 | 14,920 | 38,100 | 2.55 | 0.25 |

*S = styrene
**AA = acrylic acid
***AMS = α-methylstyrene
°DEGMEE = diethylene glycol monoethyl ether The results illustrate that the reaction temperature is an important factor in the present process. When reaction temperatures are set below about 235° C., the molecular weight of the polymer product is greater than 6000 and the dispersion index becomes greater than 2. Similarly, as reaction temperatures rise above 310° C., the molecular weight of the product is reduced to the high oligomer range and the optical density is severely compromised. The lower the value for optical density, the clearer the polymer product.

Example III

In order to evaluate the effect of residence time on the process a series of test runs were conducted and reported in accordance with the procedure of Example I and the results were recorded in Table 2.

TABLE 2

| Monomers parts/parts | Feed Rate lbs/min | Reaction temp. °C. | Residence time minutes | Mn | Mw/Mn | O.D. (400 nm) |
|---|---|---|---|---|---|---|
| 68S/32AA + 10% DEGMEE | 1.16 | 253 | 1.0 | 5640 | 3 | 0.03 |
| 31S/37AMS/32AA | 1.0 | 274 | 4 | 2370 | 1.67 | 0.81 |
| 68S/32AA + 10% DEGMEE | 0.8 | 278 | 5 | 2780 | 1.72 | 0.09 |
| 68S/32AA + 10% DEGMEE | 0.4 | 263 | 9 | 3060 | 1.76 | 0.07 |
| 68S/32AA | 0.4 | 267 | 10 | 3130 | 1.66 | 0.11 |
| 68S/32AA + 10% DEGMEE | 0.26 | 278 | 15 | 2000 | 1.57 | 0.18 |
| 37AMS/31S/32AA | 0.23 | 260 | 20 | 2010 | 1.59 | 0.28 |
| 68S/32AA | 0.23 | 266 | 23 | 2590 | 1.62 | 0.18 |
| 68S/32AA + 10% DEGMEE | 0.23 | 261 | 25 | 2690 | 1.67 | 0.11 |
| 68S/32AA + 10% DEGMEE | 0.18 | 260 | 45 | 2520 | 1.67 | 0.13 |
| 68S/32AA | 0.12 | 266 | 50 | 2150 | 1.57 | 0.37 |

The results show the significant effect of residence time of reaction mixture on the process. As the residence time is reduced to less than about two minutes, the molecular weight and dispersion index are adversely effected.

Example IV

In order to illustrate the effects of employing a solvent in the monomers mix, tests were run in accordance with the procedure of Example I. The quantity of solvent added to the monomers mix was varied between 5 and 20% by weight of total monomers mix. For illustrative purposes a test run is provided wherein no solvent was employed. The results are reported in Table 3. Mn is number average molecular weight and Mw is the weight average molecular weight. The acid number is the number of milligrams of potassium hydroxide required to neutralize one gram of the substance.

TABLE 3

| Monomer | % DEGMEE* | T (°C.) | Res. Time (min.) | Feed Rate (lbs/min) | Mn | Mw/Mn | Optical Density (400 nm) | Acid Number |
|---|---|---|---|---|---|---|---|---|
| 72S/28AA | 5 | 277 | 10 | 0.5 | 2770 | 1.81 | 0.15 | 173 |
| 72S/28AA | 0 | 274 | 10 | 0.4 | 2450 | 1.64 | 0.15 | 196 |
| 72S/28AA | 10 | 263 | 15 | 0.26 | 3370 | 1.75 | 0.10 | 150 |
| 72S/28AA | 0 | 262 | 8 | 0.80 | 3140 | 1.72 | 0.10 | 189 |
| 37AMS/31S/32AA | 20 | 263 | 28 | 0.18 | 1700 | 1.56 | 0.26 | 160 |
| 37AMS/31S/32AA | 0 | 260 | 20 | 0.23 | 1820 | 1.54 | 0.42 | 239 |

*DEGMEE is diethylene glycol monoethyl ether.

As is evident from the results tabulated hereinabove, the use of a solvent can vary the acid number of the product.

Example V

The temperature dependency of the present process when a solvent is additionally employed is illustrated in the tabulation of test runs conducted according to Example 1, set forth in Table 4.

TABLE 4

| Monomer | % DEGMEE | Reaction Time Minutes | Feed Rate lbs/min | Reaction Temp. °C. | Mn | Mw/Mn | O.D.* |
|---|---|---|---|---|---|---|---|
| 37AMS/31S/32AA | 10 | 20 | 0.2 | 299 | 1120 | 1.43 | 2.0 |
| 37AMS/31S/32AA | 10 | 15 | 0.26 | 262 | 2200 | 1.64 | 0.05 |
| 37AMS/31S/32AA | 10 | 5 | 0.8 | 257 | 3570 | 1.90 | .07 |
| 37AMS/31S/32AA | 20 | 10 | 0.4 | 252 | 3380 | 1.78 | .03 |
| 37AMS/31S/32AA | 20 | 10 | 0.4 | 249 | 3650 | 1.67 | .21 |
| 35AMS/30S/34AA | 10 | 10 | 0.4 | 243 | 4530 | 1.94 | .19 |
| 37AMS/31S/32AA | 10 | 10 | 0.4 | 241 | 4690 | 1.92 | 0.16 |

TABLE 4-continued

| Monomer | % DEGMEE | Reaction Time Minutes | Feed Rate lbs/min | Reaction Temp. °C. | Mn | Mw/Mn | O.D.* |
|---|---|---|---|---|---|---|---|
| 36AMS/30S/34AA | 10 | 10 | 0.4 | 221 | 6580 | 2.33 | .05 |
| 37AMS/31S/32AA | 10 | 1 | 1.3 | 178 | 10,270 | 2.46 | .28 |

*a 400 nm

The polymers produced by the process of the invention can be employed in conventional floor finishing compositions, inks and the like. Other uses will be apparent to those with ordinary skill in this field.

Although the invention has been described in detail by referring to certain preferred embodiments, it will be understood that various modifications can be made within the spirit and scope of the invention. The invention is not to be limited except as set forth in the following claims.

We claim:

1. Bulk polymerization process for preparing low molecular weight vinylic polymers having a dispersion index less than about 2 and a number average molecular weight from about 1000 to 6000 comprising the steps of continuously:
(a) charging a mixture of vinylic monomers into a continuous stirred reactor zone containing a molten resin mixture of unreacted vinylic monomers and said vinylic polymer product;
(b) maintaining the molten resin mixture at a reaction temperature from about 235° C. to 310° C.;
(c) maintaining a flow rate through said reaction zone sufficient (1) to provide a residence time of said charged vinylic monomer mixture in said reaction zone of at least about 2 minutes to provide a reaction product; and (2) to maintain a predetermined level of reaction mixture in said reaction zone; wherein said mixture of vinylic monomers comprises at least one monoalkenyl aromatic monomer and at least one acrylic monomer.

2. The process of claim 1 wherein the monoalkenyl aromatic monomer is from about 60-80% by weight and the acrylic monomer is from about 40-20% by weight.

3. The process of claim 1 including the step of separating the copolymer reaction product from unreacted monomers and by-products.

4. The process of claim 2 wherein the monoalkenyl aromatic monomer is styrene or a mixture of α-methyl styrene and styrene having a weight ratio from about 1:2 to 2:1 and the acrylic monomer is acrylic acid.

5. The process of claim 1 wherein the mixture of vinylic monomers includes from about 1-10% by weight diethylene glycol monoethyl ether.

6. The process of claim 4 wherein the reaction temperature is from about 245° C. to 275° C. and the residence time is from about 5 to 45 minutes.

7. Low molecular weight vinylic polymers of at least one monoalkenyl aromatic monomer and at least one acrylic monomer having a dispersion index less than about 2 and a number average molecular weight from about 1000 to 6000 formed by the bulk polymerization process which comprises the steps of continuously:
(a) charging a mixture of vinylic monomers into a continuous stirred reactor zone containing a molten resin mixture of unreacted vinylic monomers and said vinylic polymer product;
(b) maintaining the molten resin mixture at a reaction temperature from about 235° C. to 310° C.; and
(c) maintaining a flow rate through said reaction zone sufficient (1) to provide a residence time of said charged vinylic monomer mixture in said reaction zone of at least about 2 minutes to provide a reaction product; and (2) to maintain a predetermined level of reaction mixture in said reaction zone.

8. The product of claim 7 in which the monoalkenyl aromatic monomer is styrene or a mixture of styrene and alphamethyl styrene.

9. The product of claim 7 in which a solvent capable of forming a reaction product with the polymer is employed in the mixture of vinylic monomers.

* * * * *